(12) United States Patent
Cambou et al.

(10) Patent No.: US 11,568,221 B2
(45) Date of Patent: Jan. 31, 2023

(54) ARTIFICIAL NEURON SYNAPTIC WEIGHTS IMPLEMENTED WITH VARIABLE DISSOLVABLE CONDUCTIVE PATHS

(71) Applicants: Arizona Board of Regents on Behalf of Northern Arizona University, Flagstaff, AZ (US); Government of the United States of America, as represented by the Secretary of the Air Force, Rome, NY (US)

(72) Inventors: Bertrand F Cambou, Flagstaff, AZ (US); Donald A. Telesca, Jr., Whitesboro, NY (US); Brayden Cole David Villa, Flagstaff, AZ (US)

(73) Assignees: ARIZONA BOARD OF REGENTS ON BEHALF OF NORTHERN ARIZONA UNIVERSITY, Flagstaff, AZ (US); GOVERNMENT OF THE UNITED STATES OF AMERICA, AS REPRESENTED BY THE SECRETARY OF THE AIRFORCE, Rome, NY (US)

( * ) Notice: Subject to any disclaimer, the term of this patent is extended or adjusted under 35 U.S.C. 154(b) by 764 days.

(21) Appl. No.: 16/297,441

(22) Filed: Mar. 8, 2019

(65) Prior Publication Data
US 2019/0279078 A1    Sep. 12, 2019

Related U.S. Application Data

(60) Provisional application No. 62/640,832, filed on Mar. 9, 2018.

(51) Int. Cl.
*G06N 3/063* (2006.01)
*G06N 3/04* (2006.01)

(52) U.S. Cl.
CPC ........... *G06N 3/063* (2013.01); *G06N 3/0481* (2013.01)

(58) Field of Classification Search
CPC ......... G06N 3/063; G06N 3/0481; G06N 3/04
See application file for complete search history.

(56) References Cited

U.S. PATENT DOCUMENTS

| | | | |
|---|---|---|---|
| 2014/0310217 A1* | 10/2014 | Sarah ..................... | G06N 3/063 706/15 |
| 2015/0170025 A1* | 6/2015 | Wu ..................... | G11C 13/0069 706/25 |
| 2015/0269483 A1* | 9/2015 | Nishitani ............... | G06N 3/084 706/25 |

(Continued)

OTHER PUBLICATIONS

Wong, H-S. Philip, et al. "Metal-oxide RRAM." Proceedings of the IEEE 100.6 (2012): 1951-1970. (Year: 2012).*

(Continued)

*Primary Examiner* — Kamran Afshar
*Assistant Examiner* — Randall K. Baldwin
(74) *Attorney, Agent, or Firm* — Quarles & Brady LLP

(57) ABSTRACT

A low-power, controllable, and reconfigurable method to control weights in model neurons in an Artificial Neural Network is disclosed. Memristors are utilized as adjustable synapses, where the memristor resistance reflects the synapse weight. The injection of extremely small electric currents (a few nanoamperes) in each cell forces the resistance to drop abruptly by several orders of magnitudes due to the formation of a conductive path between the two electrodes. These conductive paths dissolve as soon as the current injection stops, and the cells return to their initial state. A repeated injection of currents into the same cell results in an almost identical effect in resistance drop. Different, stable resistance values in each cell can be controllably achieved by injecting different current values.

15 Claims, 15 Drawing Sheets

(56) References Cited

U.S. PATENT DOCUMENTS

2018/0005115 A1* 1/2018 Gokmen ................ G06N 3/084
2018/0075338 A1* 3/2018 Gokmen .............. G06N 3/0454

OTHER PUBLICATIONS

Duan, Shukai, et al. "Memristor-based cellular nonlinear/neural network: design, analysis, and applications." IEEE transactions on neural networks and learning systems 26.6 (2014): 1202-1213. (Year: 2014).*

Hu, Xiaofang, et al. "A memristive multilayer cellular neural network with applications to image processing." IEEE transactions on neural networks and learning systems 28.8 (2016): 1889-1901. (Year: 2016).*

He, Xingli, et al. "Transient resistive switching devices made from egg albumen dielectrics and dissolvable electrodes." ACS applied materials & interfaces 8.17 (2016): 10954-10960. (Year: 2016).*

Liu, Xiaoxiao, et al. "Harmonica: A framework of heterogeneous computing systems with memristor-based neuromorphic computing accelerators." IEEE Transactions on Circuits and Systems I: Regular Papers 63.5 (2016): 617-628. (Year: 2016).*

Dickey, Michael D. "Stretchable and soft electronics using liquid metals." Advanced Materials 29.27 (2017): 1606425. (Year: 2017).*

Cagli, Carlo, et al. "Evidence for threshold switching in the set process of NiO-based RRAM and physical modeling for set, reset, retention and disturb prediction." 2008 IEEE International Electron Devices Meeting. IEEE, 2008. (Year: 2008).*

Vandelli, Luca, et al. "Comprehensive physical modeling of forming and switching operations in HfO2 RRAM devices." 2011 International Electron Devices Meeting. IEEE, 2011. (Year: 2011).*

Zhao, Jianhui, et al. "An electronic synapse memristor device with conductance linearity using quantized conduction for neuroinspired computing." Journal of Materials Chemistry C 7.5 (Dec. 2018): 1298-1306. (Year: 2018).*

* cited by examiner

Control input signal

Control transmission

Adjustable filter

ARTIFICIAL NEURON SYNAPTIC WEIGHTS IMPLEMENTED WITH VARIABLE DISSOLVABLE CONDUCTIVE PATHS

CROSS-REFERENCE TO RELATED APPLICATION

This application claims priority to U.S. Provisional Application No. 62/640,832 filed on Mar. 9, 2018, the entire contents of which is incorporated herein by reference.

STATEMENT REGARDING FEDERALLY SPONSORED RESEARCH OR DEVELOPMENT

This invention was made with government support under Grant No. FA8075-16-D-0001 awarded by U.S. Department of Defense. The government has certain rights in the invention.

FIELD OF THE INVENTION

The present invention relates to variable resistor elements used for physical hardware-based artificial neural networks.

BACKGROUND

Neural networks (NNs) and artificial neural networks (ANNs) are information processing systems that are loosely based on the models of biological neural networks. They are implemented in software or electronic circuits and have the several defining properties: 1) the NN consists of simple building blocks that can be called neurons, nodes, or units; 2) the connectivity between the neurons determines the functionality of the neural network; 3) the NN must be able to learn; and 4) the NN must be able to generalize.

Human biological functioning has been the inspiration for these neural networks starting from the Perceptron that was developed in the 1950's and 1960's by the scientist Frank Rosenblatt, inspired by the earlier work of Warren McCulloch and Walter Pitts. The human brain is composed of approximately $10^{11}$ neurons (or nerve cells). The dendrites are the incoming extensions that carry signals into the neuron. The axons are the outgoing extensions which carry signals out of the neuron. The synapse are the connections between two neurons. In neuroscience and computer science, synaptic weight refers to the strength or amplitude of a connection between two nodes, corresponding in biology to the amount of influence the firing of one neuron has on another. In the biological mode, learning occurs when new connections are formed between the neurons, or by modifying existing connections.

These biological networks can be modeled and applied to information processing networks to produce computational models with a range of applications including, but not limited to, cybersecurity and secure authentication methods.

SUMMARY

The above features and advantages of the present invention will be better understood from the following detailed description taken in conjunction with the accompanying drawings.

In an embodiment, a system includes a physical neural network comprising a plurality of neurons, each neuron of the plurality of neurons comprising circuitry having at least one memristor and at least one input connection receiving an input signal, wherein at least a first memristor is a substantially nonlinear resistor having a resistance that substantially changes with relation to an electrical current passing through the first memristor, and, wherein at least a first input connection of at least a first neuron of the plurality of neurons comprises at least a first synaptic weight, wherein the first synaptic weight comprises a multiplicative gain applied to a first input signal received by the first input connection, and, a controller coupled to the physical neural network, the controller configured to execute instructions for receiving commands, wherein each command comprises a target resistance value and a corresponding memristor in the plurality of neurons; and, determining, for each command, a current value corresponding to the target resistance value in the corresponding memristor, and applying, for each command, the determined current value to the corresponding memristor.

In another embodiment, a system includes a physical neural network comprising a plurality of neurons, each neuron of the plurality of neurons comprising circuitry having at least one memristor, wherein at least a first memristor is a substantially nonlinear resistor having a resistance that substantially changes with relation to an electrical current passing through the first memristor; and, wherein an electrical current passing through the first memristor is limited such that the memristor is operated according to the temporary dissolvable conductive path method, such that the current value is limited to be below a known forming threshold in order to avoid creating a conductive filament within the memristor, and such that the memristor resistance returns to a baseline value upon cessation of the current.

In another embodiment, a system includes a physical neural network comprising a plurality of neurons, each neuron of the plurality of neurons comprising circuitry having at least one memristor and at least one input connection receiving an input signal, wherein at least a first memristor is a substantially nonlinear resistor having a resistance that substantially changes with relation to an electrical current passing through the first memristor, and, wherein at least a first input connection of at least a first neuron of the plurality of neurons is electrically coupled to at least the first memristor, such that the first memristor at least partially determines one or more electrical properties of the first input connection and a controller coupled to the physical neural network, the controller configured to execute instructions for receiving commands, wherein each command comprises a target resistance value and a corresponding memristor in the plurality of neurons, and, determining, for each command, a current value corresponding to the target resistance value in the corresponding memristor, and applying, for each command, the determined current value to the corresponding memristor.

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

The present invention provides a new means to build an artificial neural network (ANN). ANNs are comprised of elements referred to as neurons. Each neuron receives one or more inputs, and produces a single output. At a given time each input is either active or not (e.g. 1 or 0), and the neuron's output is also 1 or 0. Each input to a neuron has a corresponding "weight", which determines the strength of that input's influence on the neuron. The neuron's overall activation is the sum of all its active inputs, with each scaled by the corresponding weight. The neuron compares this sum (of weighted inputs) to a fixed threshold when deciding whether or not to fire at a given time. The unidirectional connections between neurons are referred to as "synapses" with the output of a pre-synaptic neuron becoming the input of a post-synaptic neuron. Each synapse has a "weight" which determines a pre-synaptic neuron's influence on the post-synaptic neuron: a high weight means that the pre-synaptic neuron can easily cause the post-synaptic neuron to fire; a low weight synapse mean that the pre-synaptic neuron has only a weak influence on the post-synaptic neuron.

Neurons and synapses are collected together into neural networks. An ANN can use this collection of neurons to perform tasks which are difficult to perform with standard computer logic, with examples including image classification and speech recognition.

Figure 4A:
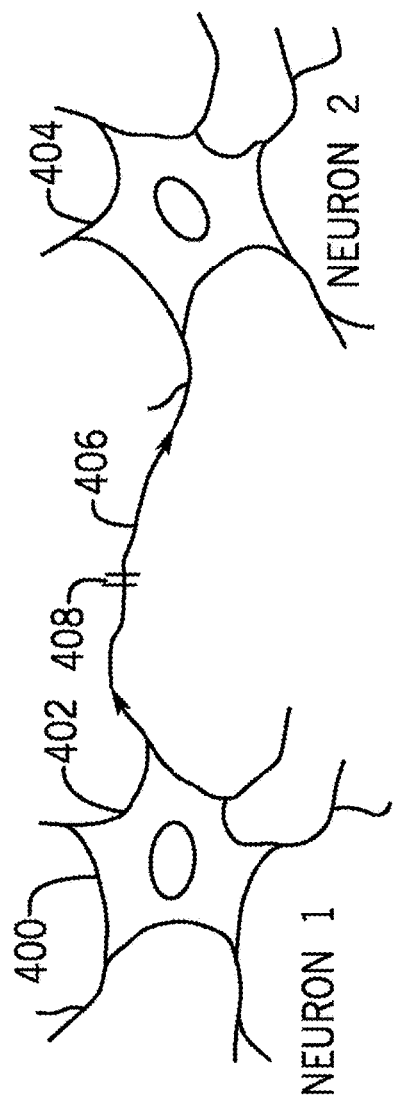
FIG. 4A is a schematic depicting two biological neurons and a connecting synapse.

For both artificial and biological neural networks, the basic unit of computation is individual neurons and their connections. A schematic of a biological neural connection is shown in FIG. 4A. The first neuron 400 emits output signals through its axon 402. The second neuron 404 receives input signals through its dendrites 406. Each time the first neuron 400 emits a signal, that signal is received by the second neuron 404. The intensity of the signal received by the second neuron 404 is determined by the strength (the "weight") of the synapse 408. The synapse 408 is the connection where the output (axon 402) of the first neuron 400 meets the input (dendrite 406) of the second neuron. The second neuron 404 receives input through one or more dendrites 406, then sums all inputs together, then compares that sum to a threshold to determine if the second neuron is sufficiently activated to emit its own output (i.e. if it "fires"). An essential feature of biological neural networks is the ability to adjust the weight of each synapse 408. Adjusting of synaptic weights is a biological underpinning of learning.

Figure 4B:
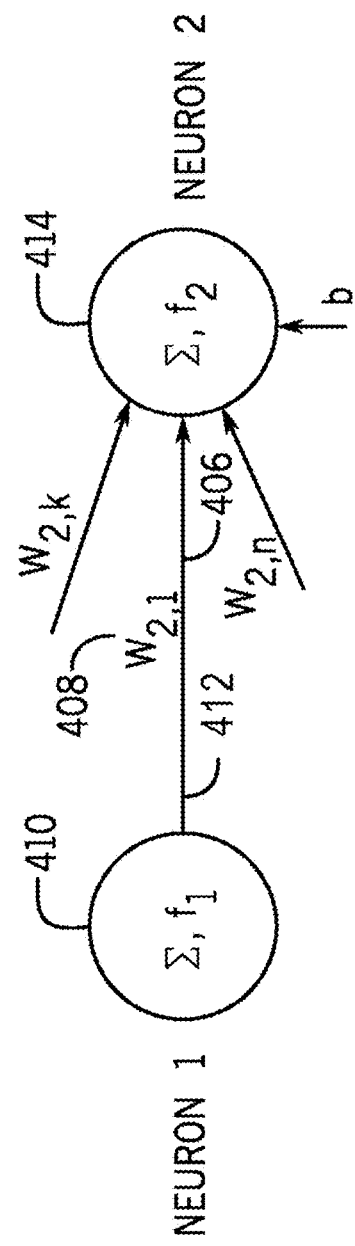
FIG. 4B is a schematic showing the abstraction of biological neurons into artificial neurons used in neural networks.

An abstracted schematic of a biological or artificial neural connection is shown in FIG. 4B. In this schematic, the first neuron 410 takes the sum $\Sigma$ of its input and passes this sum through a thresholding function $f_1$ to determine its output on the outgoing axon 412. A neuron's output is either "fire" or nothing; there is no partial output from a neuron, all outputs are the same. This signal is received by the dendrite 406 of the second neuron 414. At each axon-dendrite connection, there is a synapse 408 with a particular synaptic weight w. This weight may be understood in some cases to be the relative importance of each input on the second neuron 414.

Each neuron has a threshold that must be met to activate the neuron, causing it to "fire." The threshold is modeled with the transfer function, $f$. Neurons can be fall into two categories; the first is that they can be excitatory, causing other neurons to fire when they are stimulated. The second is that they can be inhibitory, preventing other neurons from firing when they are stimulated. Excitatory neurons may be modeled as having positive synaptic weights on their outgoing synapses, while inhibitory neurons may be modeled as having negative synaptic weights on their outgoing synapses.

Figure 13:
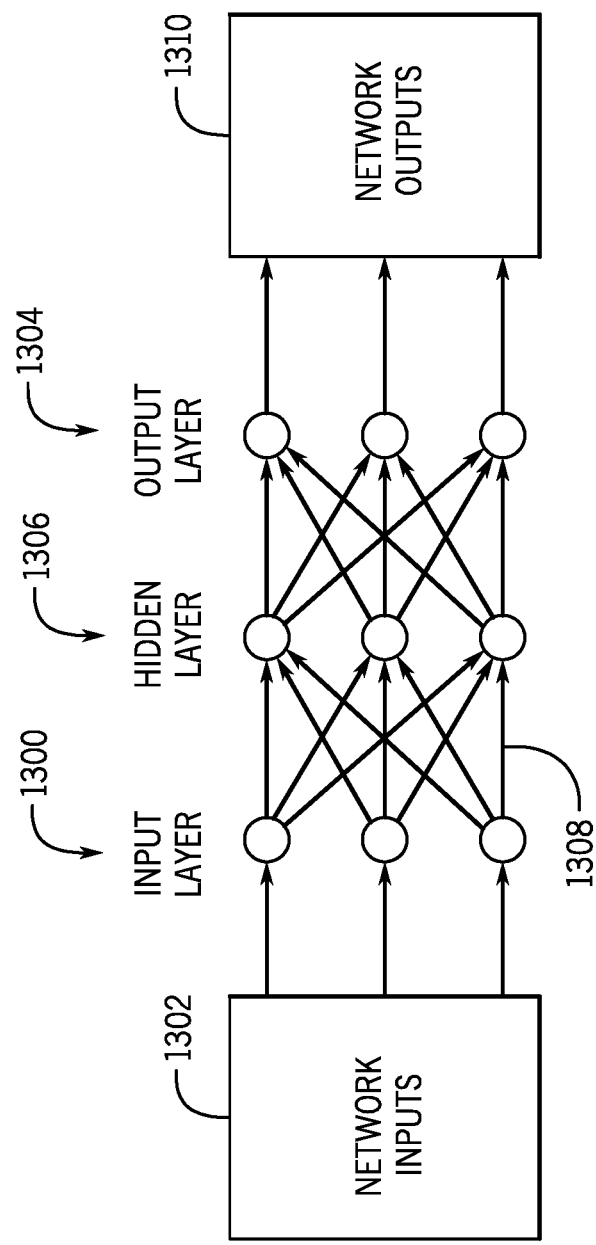
FIG. 13 depicts a diagram of a multi-layer artificial neural network.

One form of an ANN uses "layers" of neurons as depicted in FIG. 13. An input layer 1300 receives direct inputs 1302 from external data. An output layer 1304 produces the ANN's final output 1310, it's "decision" (e.g. a classification of an image). Zero or more hidden layers 1306 between the input and output layers perform intermediate calculations. Each connection 1308 (each arrow) between neurons has a synaptic weight, a scalar value which determines the influence of each input on the post-synaptic neuron.

Figure 14:
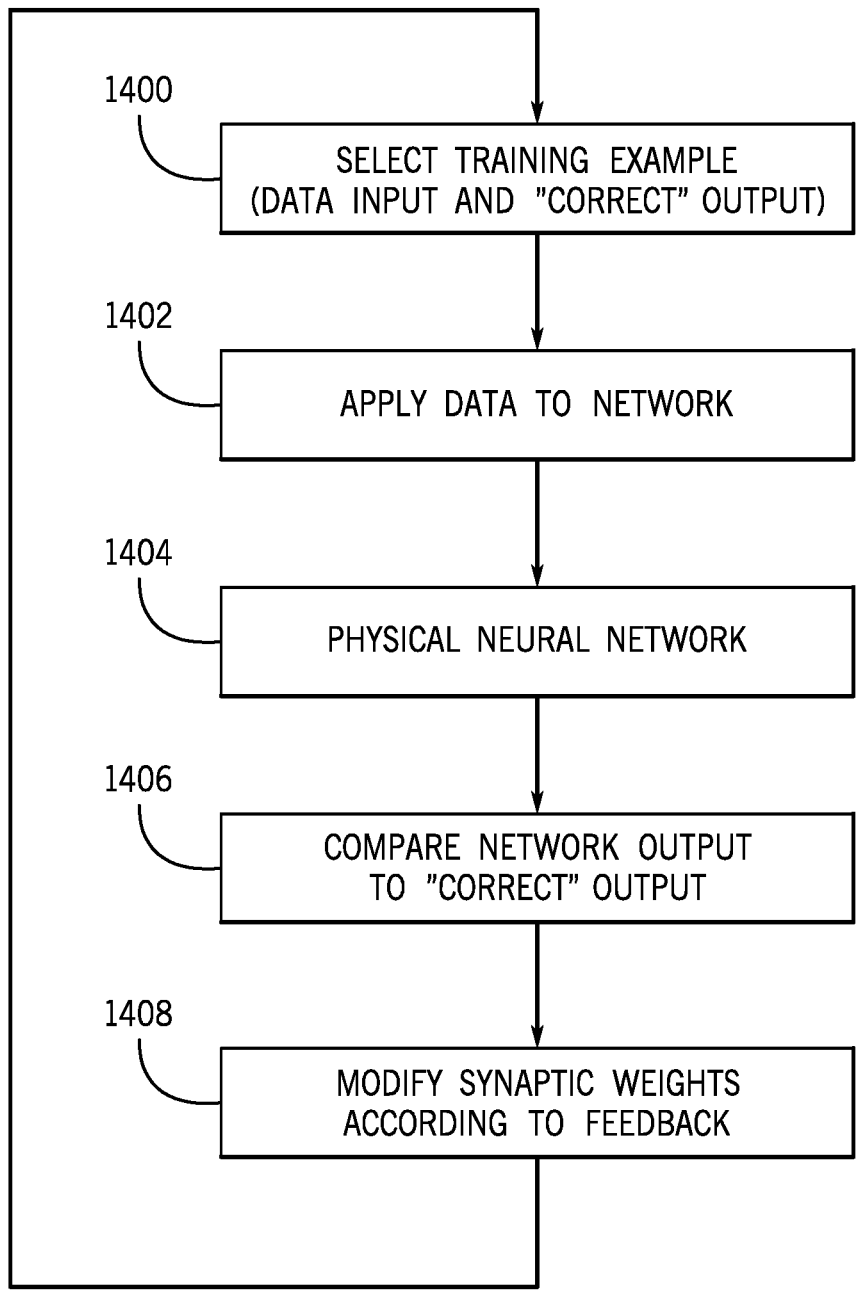
FIG. 14 depicts a flow chart of a supervised learning algorithm as applied to a physical neural network.

The process of "training" a neural network generally involves a repeated process of adjusting synaptic weights. In a biological NN, this process is an underlying mechanism of learning. One example usage of an ANN is to classify images. An ANN may be trained by a process of "supervised learning", wherein the network is supplied with labeled examples (e.g. images and their corresponding classifications). The network learns to map from inputs (e.g. images) to outputs (e.g. classifications) by a trial-and-error process of adjusting the synaptic weights between neurons throughout the layers of the ANN. After an initial default ("blank") setting of the synaptic weights, the training process involves several steps as shown in FIG. 14. An example image is drawn from the training data set (1400). The data of this image is applied to the ANN "input layer" (1402). The "input layer" then drives its output into zero or more "hidden layers", which drive output into the "output layer" of the ANN (1404). The ANN output is compared to the predetermined classification of the image, to assess if the ANN is "correct" (1406). Then, the synapses are modified based on this feedback 1408, e.g. by rules such as "if the output is correct then the participating synapses are strengthened; if the output is incorrect then the participating synapses are weakened". This sequence of steps (1400 to 1408) may be repeated multiple times with multiple examples to train the ANN. Synaptic weights may be adjusted many times in the process of training an ANN, and when training is complete the "knowledge" of the ANN is contained in the synaptic weights (in combination with the layout of the network, but the layout is not changed).

Many common implementations of ANNs are entirely software-based, in that the neurons, synapses, and weights exist entirely as digital values subject to mathematical operations on standard computing hardware. In this sense, a software-based ANN is a simulation. In contrast, a Physical Neural Network (PNN) is a type of ANN in which the network components exist as distinct physical objects. In one example, a PNN could use analog hardware such as memristors to model neural network parameters such as synaptic weights. Embodying an NN as a PNN may allow for faster speed or stronger security of an NN application.

PNN hardware components are generally adjustable or configurable in some way. This is generally required because ANNs, like biological neural networks, must adjust parameters (e.g. synaptic weights) in order to learn and change. As described in the present disclosure, a current-injected, dissolvable filament may be used to model a synaptic weight in a PNN, acting as the corollary to the biological synapse. This form of ReRAM-based PNN has several advantages described herein.

Herein, the term "Resistive Random Access Memory", or ReRAM, is a generic term that includes, but is not limited by, Conductive Bridge RAM (CBRAM), Memristor, or phase change memory types. ReRAM is a means of storing information as resistance values. A ReRAM cell may have two states: low-resistance and high-resistance, which represent 0 and 1 digital values of the cell. A ReRAM cell may be "read" by measuring the resistance, and a ReRAM cell may be "set" by adjusting the resistance to become high or low. By this means, the ReRAM cell stores digital information as a resistance value.

Figure 1:
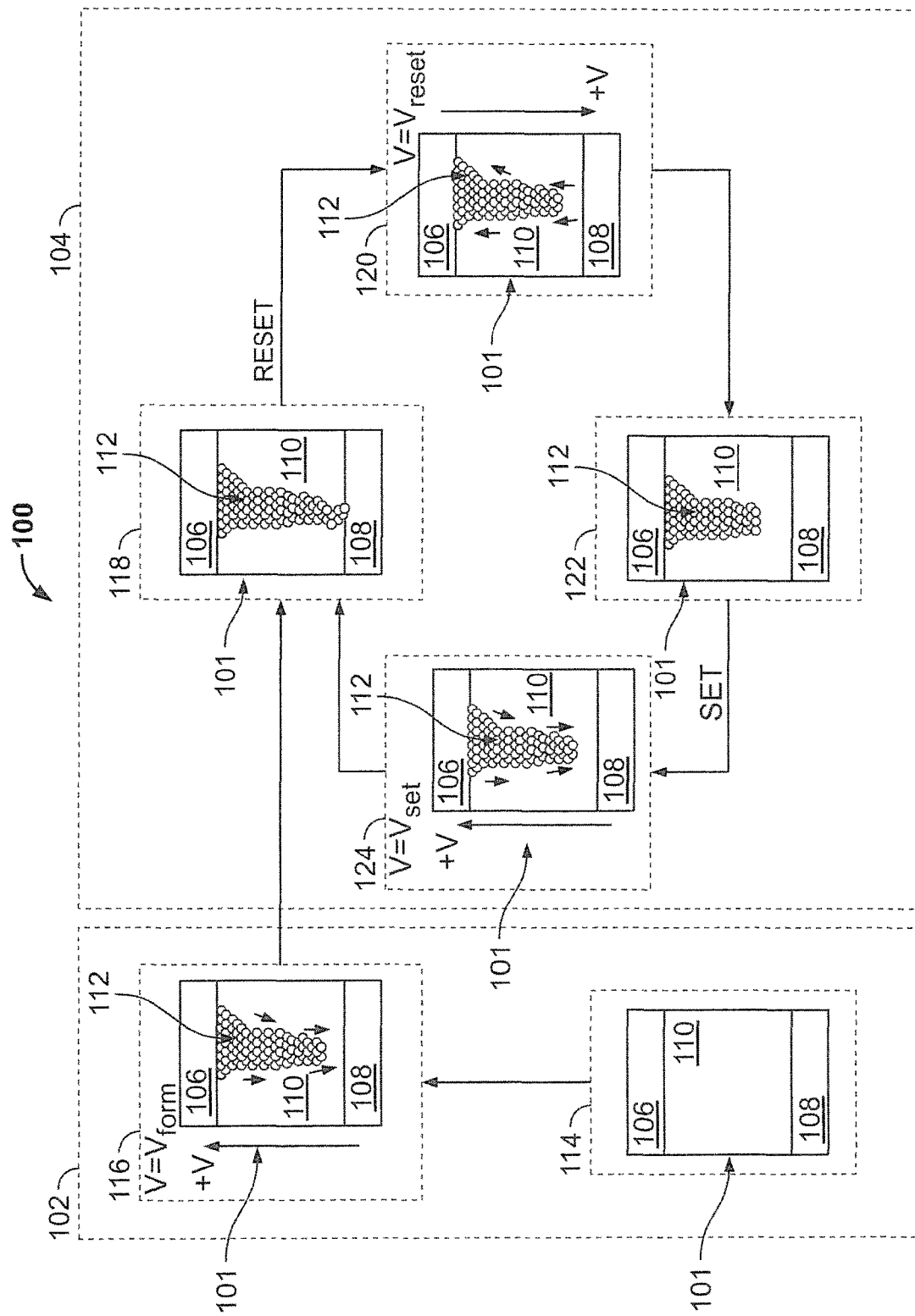
FIG. 1 is a schematic depicting the forming and programming of a Resistive RAM (ReRAM) array.

FIG. 1 shows an illustrative state diagram 100 depicting the transition of a given ReRAM cell 101 through various states as the cell undergoes forming, programming, and erasing processes. After forming, the cells of ReRAMs have two levels of resistance, the high resistance state (HRS) 122 to store a "1" and a low resistance state (LRS) 118 to store a "0". For example, the LRS may correspond to a resistance of about 5 kΩ and the HRS may correspond to a resistance of about 100 kΩ, whereas the resistance between the electrodes of the ReRAM cell 101 may have a resistance of 20 MΩ prior to forming. Each cell has an active top electrode 106, the anode, susceptible to the release positive ions (e.g., metallic ions or oxygen vacancies), a neutral bottom electrode 108, the cathode, and a dielectric 110 allowing the positive ions to migrate when subject to an electric field E. The electric field E is proportional to the voltage V applied between the two electrodes. The force $\mathcal{F}$ applied to the positive ions is proportional to the charge q of the ions and the voltage V:

$$\mathcal{F} = \alpha q V/d$$

with α being a constant, and d being the distance between the top electrode 106, and the bottom electrode 108.

During a forming cycle 102, sometimes referred to herein as the "forming cycle," all cells of a ReRAM device (e.g., including the ReRAM cell 101) are conditioned with the formation of a conductive filament 112, which reduces the resistance between the two electrodes 106 and 108. For example, the conductive filament 112 may include positive ions (e.g., metallic ions or oxygen vacancies) that migrate from the top electrode 106 when subject to an electric field generated when a voltage $V_{form}$ is applied across the top electrode 106 and the bottom electrode 108. In this way, the ReRAM cell 101 transitions from an "unformed" state 114 to a "formed" state 116. The energy needed during the forming cycle 102 is relatively high, and is part of the upfront conditioning of the ReRAM cell 101. It should be noted that the majority of the conductive filament 112 formed during the forming cycle 102 may be considered permanent, with the remaining portion of the conductive filament 112 forming a temporary conductive path that may be broken and re-formed via the application of positive or negative voltage across the top electrode 106 and the bottom electrode 108.

As shown, the subsequent program/erase cycles 104 involve the breaking or re-forming the conductive filament 112 to write a "0" (LRS), or a "1" (HRS). The energy needed to "reset", i.e., to break the filament, and to "set", i.e., re-form the filament is much lower than the energy that is needed in the forming process. For example, the ReRAM cell 101 may be in the logic "0" LRS 118 immediately after forming, with the conductive filament 112 providing an electrically conductive path between the top electrode 106 and the bottom electrode 108, and thereby lowering the resistance between the top electrode 106 and the bottom electrode 108. When it is desired to set the ReRAM cell 101 to a logic "high" state (e.g., the logic "1" FIRS 122), a reset voltage $V_{reset}$ may be applied between the top electrode 106 and the bottom electrode 108 during an intermediate resetting state 120. In the present example, $V_{reset}$ may generally be within a range of around −0.1 V to −0.3 V. During the intermediate resetting state 120, the ions of the conductive filament 112 may "break", moving away from the bottom electrode 108 as a result of the applied electric field. This breaking of the conductive filament 112 may increase the resistance between the top electrode 106 and the bottom electrode 108, causing the ReRAM cell 101 to enter the logic "1" HRS 122. When it is desired to set the ReRAM cell 101 to a logic "low" state (e.g., the logic "0" HRS 118), a set voltage $V_{set}$ (sometimes referred to as a re-forming voltage) may be applied between the bottom electrode 108 and the top electrode 106 during an intermediate re-forming state 124. During the intermediate re-forming state 124, the ions of the conductive filament 112 may move back toward the bottom electrode 108 as a result of the applied electric field.

This re-forming of the conductive filament 112 (e.g., to contact the bottom electrode 108) may decrease the resistance between the top electrode 106 and the bottom electrode 108, causing the ReRAM cell 101 to enter the logic "0" LRS 118.

Figure 2:
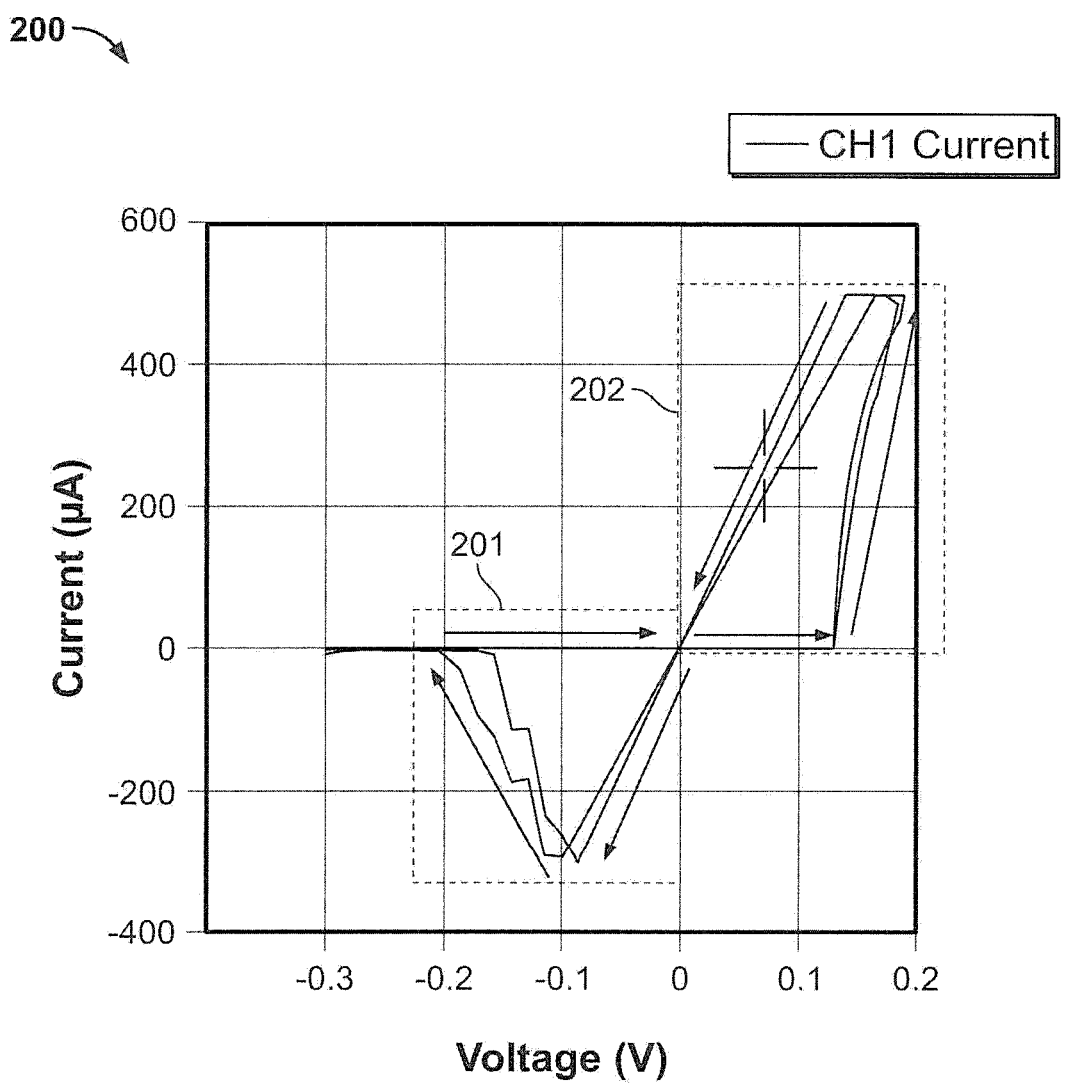
FIG. 2 shows an illustrative graph of a program and erase cycle of an Ag-based ReRAM cell.

FIG. 2 shows a graph 200 (e.g., which may be generated using a semiconductor analyzer) showing current and voltage across a silver-based (Ag) ReRAM cell (e.g., ReRAM cell 101 of FIG. 1) during the re-forming of a conductive filament (e.g., conductive filament 112 of FIG. 1). Section 202 shows the voltage and current between the top and bottom electrodes of the ReRAM cell during re-forming. As shown in the section 202, voltage is increased to about 0.15V, where current begins to sharply increase as resistance across the electrodes decreases. The voltage is then lowered back down to 0V to end the re-forming process. In the present example about 0.15V, the $V_{set}$, and 100 µA may be required to re-form the conductive filament, and to reach the LRS (e.g., the LRS 118). Using different ReRAM samples with different elements, the $V_{set}$ can vary from around 0.1V to 3V, and the currents may vary around the 10-400 µA range. One method for re-forming the conductive filament is to sweep and ramp up a positive voltage. The current between the top and bottom electrodes will abruptly increase when the positive ions create a conductive filament connecting the top and bottom electrodes. During the voltage ramp, when the voltage has reached $V_{set}$, the positive ions of the conductive filament are constantly migrating in an unstable manner, increasing the size of the conductive filament. The resistance M of the cell may drop proportionally with the current circulating in the cell. This may create an avalanche effect, with the resistance during programming (e.g., during the re-forming state 124 of FIG. 1) dropping quickly in a manner that is generally difficult to control.

A negative voltage ramp (e.g., from 0 to at least $V_{reset}$) may subsequently be applied to the ReRAM cell to break the conductive filament and return the ReRAM cell to a high resistance state (e.g., HRS 122 of FIG. 1). In section 204, the negative voltage ramp is applied, and the current increases from 0 to roughly –300 µA once the voltage reaches the $V_{reset}$ (roughly –0.1 V in the present example) before the magnitude of the current begins to decrease as the voltage is further increased to roughly –0.2V. Once the current returns to 0A while voltage is still applied, the ReRAM cell has returned to the logic "0" HRS.

Several parameters must be considered during the design of a ReRAM-based device, to account for the cell-to-cell variations within ReRAM arrays. As shown in FIG. 2, the current abruptly increases when the $V_{set}$ is reached during the voltage ramp, and $V_{set}$ is generally sensitive to manufacturing variations in the ReRAM cells. Typical measurements of ReRAM cells typically observe $V_{set}$ to be roughly within a 0.5-1V range, and current to be roughly within a 10-100 µA range for about 5 to 40 µs. In order to reset the ReRAM cell, a negative voltage (the $V_{reset}$) of about –1V is generally needed for about 1 µs and the current may be roughly 100 µA, which may drop to below roughly 50 µA when the filament breaks. The total energy needed for such a cycle (e.g., a set, forming the filament, followed by a reset, breaking the filament) is approximately 200 pJ. As shown in FIG. 2, $V_{reset}$, the voltage needed to reset a cell to High Resistance State (HRS) may be difficult to control.

Figure 3:
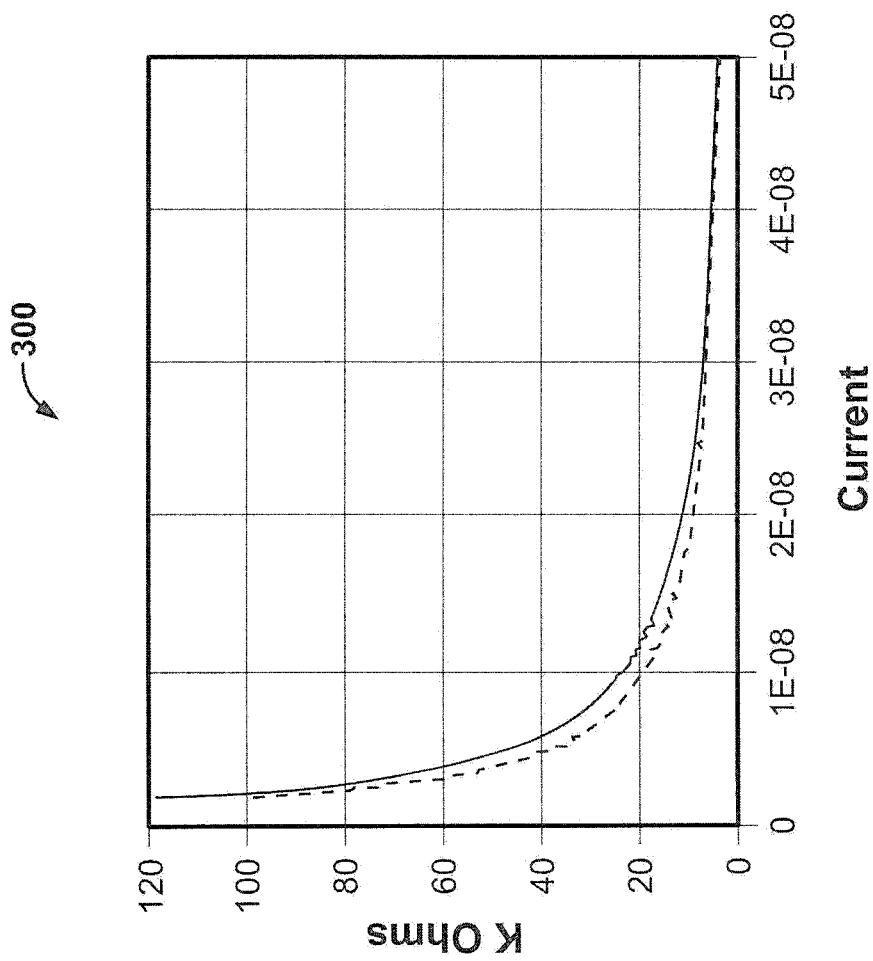
FIG. 3 shows illustrative graphs corresponding to current and resistance of a ReRAM cell during the formation of a dissolvable conductive path in the ReRAM cell via the controlled application of current.

The method of programming/erasing a ReRAM cell (e.g., re-forming/breaking a conductive filament in the ReRAM cell) by ramping voltage to $V_{set}$ or $V_{reset}$ described above in connection with FIG. 2 triggers an avalanche effect that results in an abrupt increase of the current. FIG. 3 shows graphs 300 and 302 depicting the relationship between the current and resistance of an illustrative ReRAM cell (e.g., ReRAM cell 101 of FIG. 1) to which a current-controlled is applied in an alternative method of changing the resistance of the ReRAM cell. In particular, methods described herein are based on the application of a controlled current or controlled voltage, which may be fixed or ramped, in order to form a temporary conductive path between the end of a broken conductive filament and the lower electrode of the cell. In one illustrative example, a ramped current may be applied at an electrode of the cell with a variable current source). As show, when the current injected through the top and bottom electrodes (e.g., electrodes 106 and 108 of FIG. 1) of the ReRAM cell reaches a few nano-Amperes (1 nA=$10^{-9}$A) the resistance of the ReRAM cell drops abruptly from a relatively high resistance 304 (e.g., roughly 100 kΩ; corresponding to a logic "1" state) to a relatively low resistance 306 (e.g., less than about 10 kΩ; corresponding to a logic "0" state) sometimes referred to as the conductive path resistance (RCP), allowing the current to follow a gentler trajectory compared to that of the comparatively higher-power voltage ramping method corresponding to the graph 200 of FIG. 2, in which the filament is "permanently" re-formed. Specifically, the "permanent" reforming of the conductive filament previously described in connection with FIG. 2 may be distinguished from the formation of "temporary" conductive paths of the FIG. 3, which require comparatively less power to form, and which are "temporary" in that they dissipate or "dissolve" once the applied current or voltage ceases. The sample ReRAM cell used for the measurement presented in particular example embodiment of FIG. 3 was manufactured with Silver based elements, and subject to a forming cycle post-processing (e.g., forming cycle 102 of FIG. 1). The abrupt drop in resistance is the result of a physical change in the dielectric material separating the two electrodes, along with the formation of a conductive path. The dielectric material of ReRAM cells usually contains metallic ions such as silver or copper and microscopic defects. When subject to an electric field, the metallic ions and defects get somewhat organized to create a conductive path (e.g., conductive filament 112 of FIG. 1). After the initial creation of this path, more ions, and defects migrate to enlarge the path and the resistance changes proportionally with the flux going through the structure.

It is noticeable that in this method (referred to herein as the "temporary conductive path method"), the current circulating through the dielectric is orders of magnitude lower than the current circulating during the method of programming of the cell shown in FIG. 2 (referred to herein as the "permanent conductive path method"). Specifically, the temporary conductive path method requires a current of around 20 nA versus the permanent conductive path method, which requires a current of around 10-100 µA. The peak voltage of the temporary conductive path method is also orders of magnitude lower than that of the permanent conductive path method, for example around 500 µV versus around 800 mV. These lower values mean the time needed to ramp up current to form a dissolvable, temporary conductive path is faster than the time needed to ramp voltage to form a stable, permanent filament. The total electric power involved in the measurement is therefore minuscule with the temporary conductive path method compared with the one needed to program the cell using the permanent conductive path method.

It should be noted that, about quickly as the current returns to zero, the resistance of the ReRAM cell returns to its initial value with little or no indication of prior stress. The temporary conductive paths created during the prior cycles are quickly dissolved when the electric field applied to the structure returns to zero. Repetitive cycles performed on a large number of cells are reproducible with the exception of a small number of cells that are erratic, most likely due to localized defects. Device measurements illustrating these processes are described below.

Figure 8:
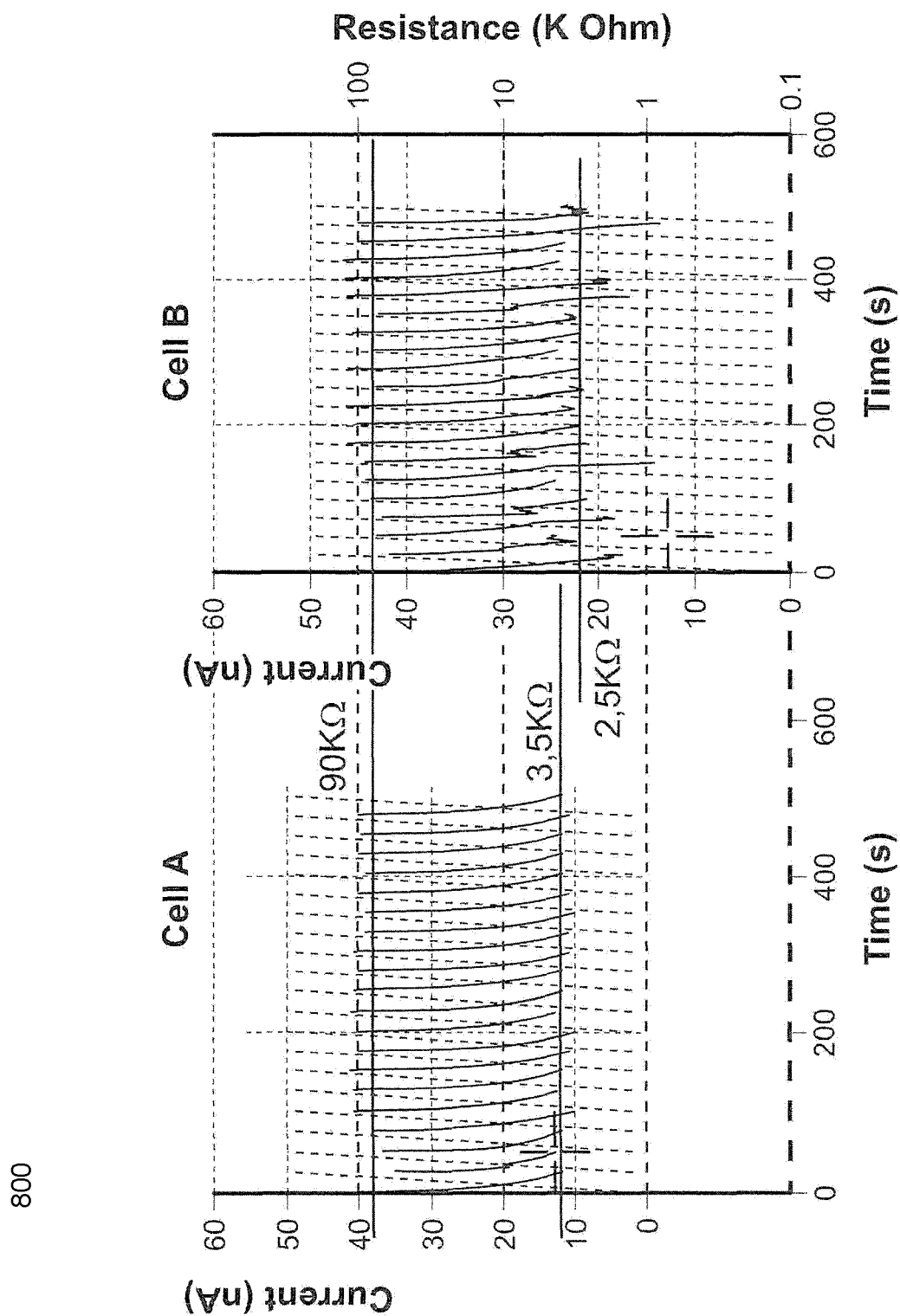
FIG. 8 shows an illustrative graph depicting the resistance values of two different Ag-based ReRAM cells that have undergone forming, as electric current is cycled through each cell.

To characterize the "temporary conductive path method", measurements were performed on ReRAM cells. FIG. 8 shows a graph 800 depicting the results (e.g., resistance and current over time) of the characterization of two silver-based (Ag) ReRAM cells, Cell A and Cell B (e.g., each corresponding to an embodiment of the ReRAM cell 101 of FIG. 1), when subjected to 20 successive cycles of generating conductive paths via the temporary conductive path method described previously. Cell A and Cell B were characterized after going through an initial forming and a reset cycle (e.g., forming cycle 102 and resetting state 120 of FIG. 1). This characterization process may sometimes be referred to herein as "post-forming temporary conductive path formation". During each cycle, the current injected into the two cells gradually increases over 25 seconds from 0 to 50 nA. The resistance of each cell is plotted concurrently with the current. In each cycle, the resistance abruptly dropped from about 90KΩ to about 3KΩ, with Cell A having an average RCP of about 3.5KΩ and Cell B having an average RCP of about 2.5KΩ. The resistance returns to the high value when the cycle is over, and the 20 successive cycles are shown to be substantially similar to each other for a given ReRAM cell. As shown, Cell A is significantly different from Cell B, with a higher average RCP. A similar pattern was observed over a large population of silver-based ReRAM cells.

Figure 9:
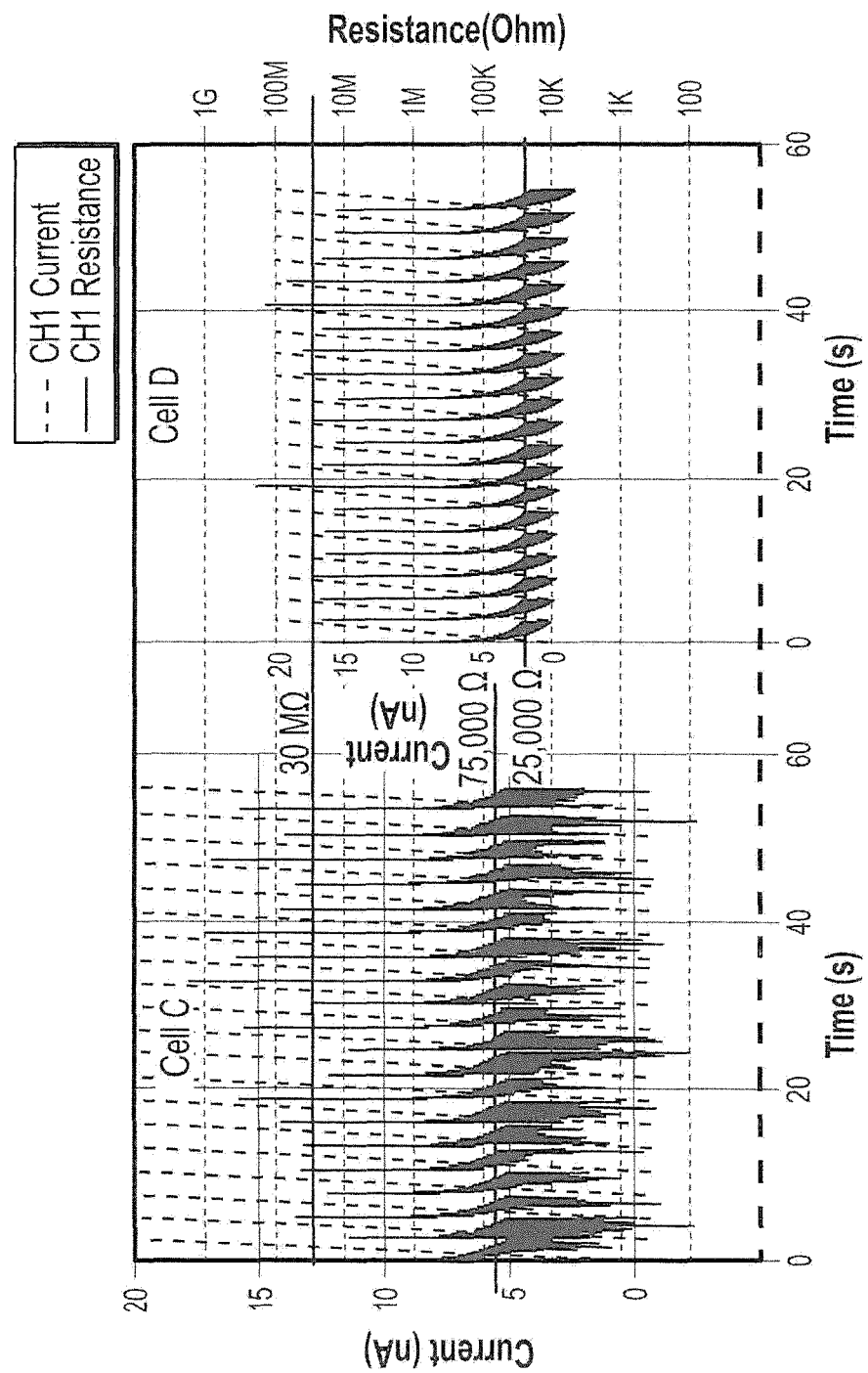
FIG. 9 shows an illustrative graph depicting the resistance values of two Cu-based ReRAM cells that have not undergone forming, as electric current is cycled through each cell.

To further characterize the "temporary conductive path method", additional measurements were performed on ReRAM cells without going through an initial forming cycle (see FIG. 1, 102). FIG. 9 shows a graph 900 depicting the results (e.g., resistance and current over time) of the characterization of two copper-silica based ReRAM cells, Cell C and Cell D, (e.g., each corresponding to an embodiment of the ReRAM cell 101 of FIG. 1), when subjected to 20 successive cycles of generating conductive paths via the temporary conductive path method described previously. The cells were characterized without going through an initial high energy forming process (e.g., forming cycle 102 of FIG. 1). This characterization process may sometimes be referred to herein as "pre-forming temporary conductive path formation". During each cycle, the current injected in the cells is gradually increased over 2.5 seconds from 0 to 50 nA. The resistance of each cell is plotted concurrently with the current. In each cycle, the resistance abruptly drops from about 30 MΩ to about 30KΩ, with Cell C having an average RCP of about 75KΩ and Cell D having an average RCP of about 25KΩ. The resistance differences from high to low are much higher than in embodiments in which formation of the temporary conductive path is performed after forming of the conductive filament. Similar to the post-forming temporary conductive path formation embodiments described previously, ReRAM cell resistances also return to the high resistance value (e.g., 30 MΩ in the case of a ReRAM cell that hasn't undergone a forming cycle) when the cycle is over (e.g., when current returns to zero), and the 20 successive cycles are again very similar to each other for a given ReRAM cell. As shown, the resistance behavior of Cell C is substantially different from Cell D. Large cell-to-cell variation over a large population of cells was also observed with pre-forming temporary conductive path formation. In the configuration of this embodiment, the vast majority of the cells characterized are stable and predictable.

Figure 10:
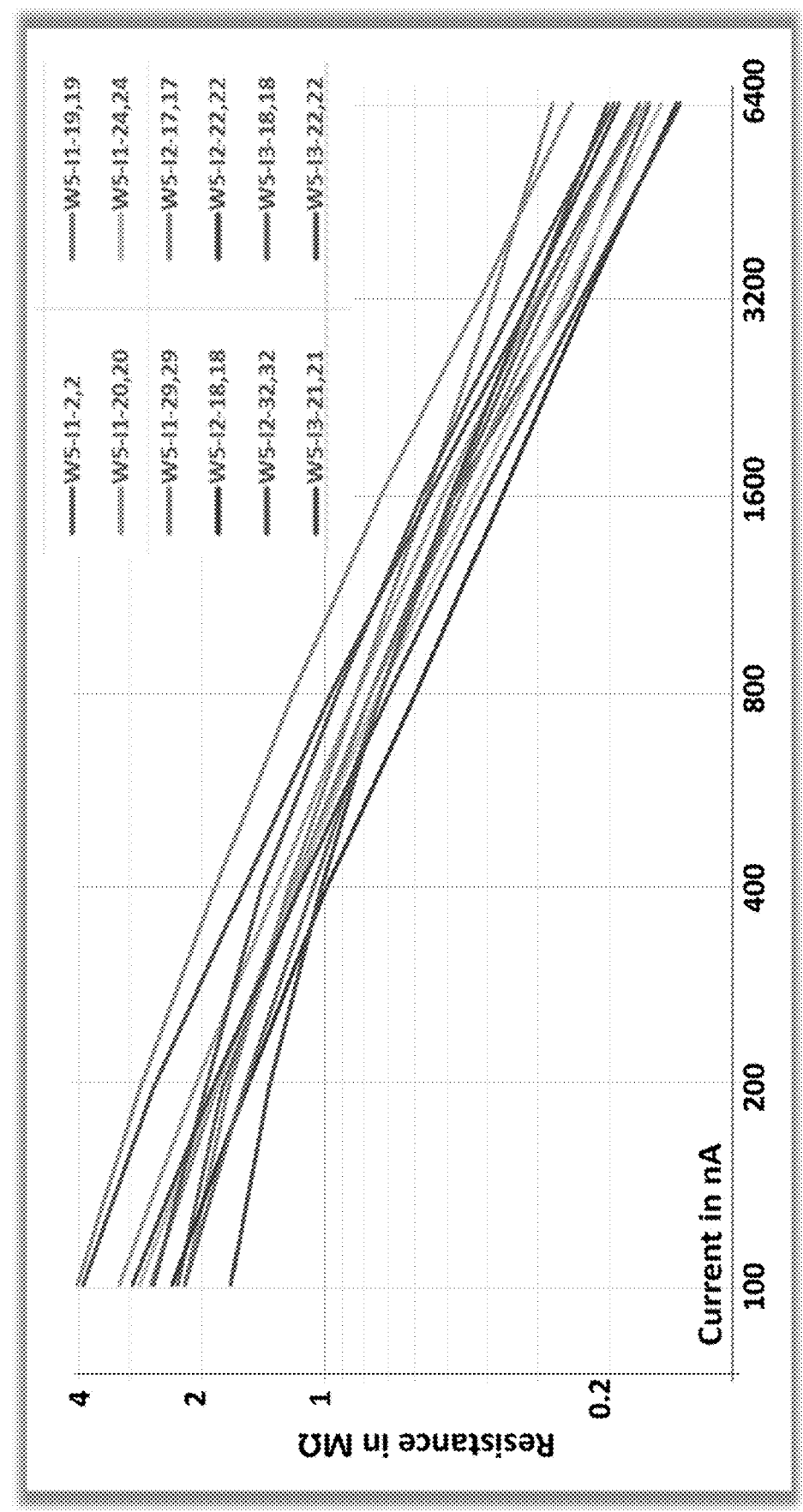
FIG. 10 shows an illustrative graph depicting directly the relationship between resistance and current for several memristor cells.

To utilize memristors as adjustable synapses, a system must be able to control the resistance and set it to a desired value. In one embodiment, each memristor is calibrated prior to use to generate a table or plot of resistance values vs. current values. An example of such a plot is shown in FIG. 10 as plot 1000. Each memristor has a separate curve. These curves are repeatable, as shown in FIG. 8 and FIG. 9.

Figure 11:
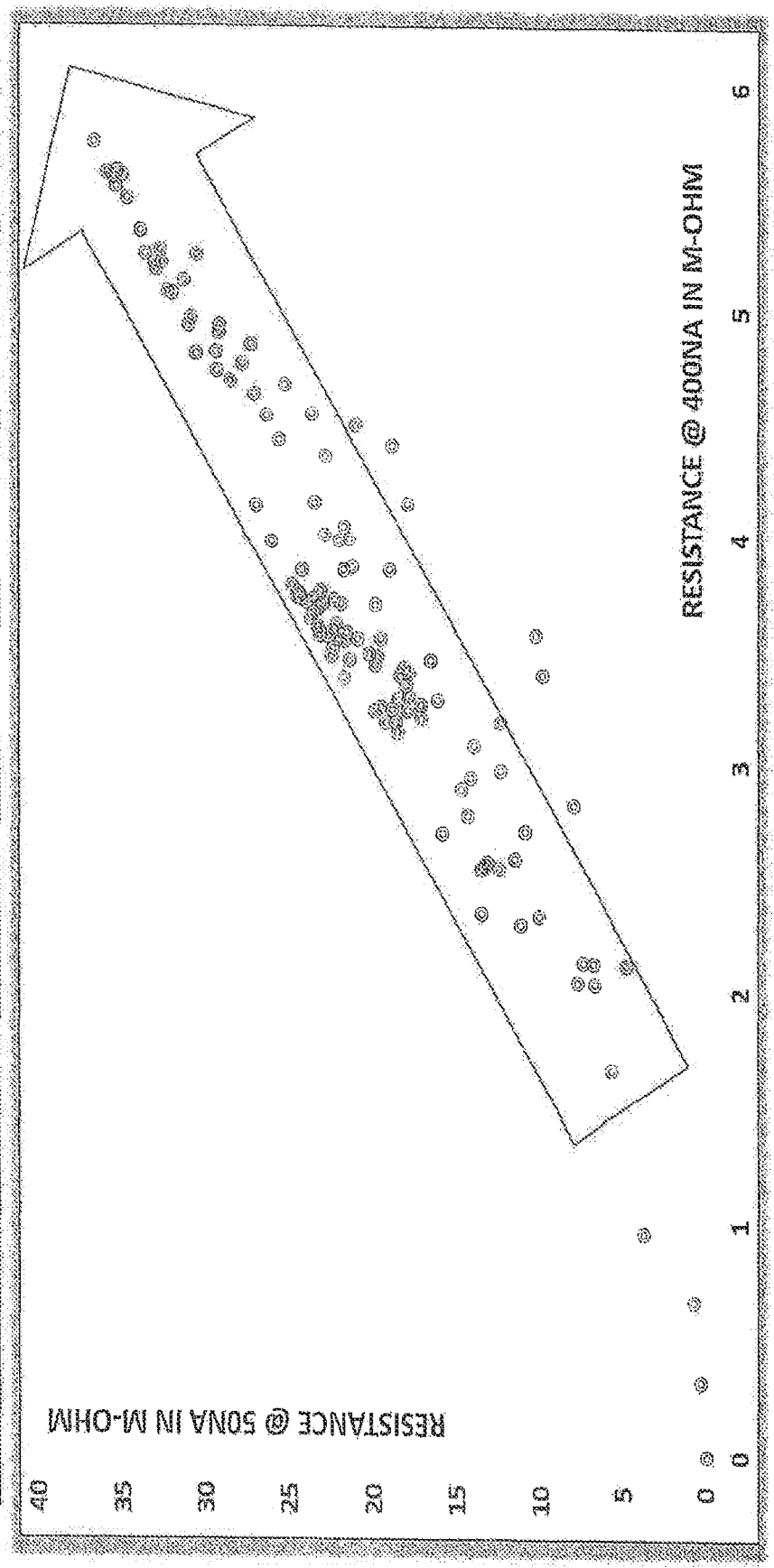
FIG. 11 shows an illustrative graph depicting the correlation between high-current and low-current resistance for several memristor cells.

Despite differences between individual memristors, the general trend of "increased resistance given increased current" is consistent, and the slope of this relationship is relatively consistent between memristors. FIG. 11 shows a scatter plot 1100 of the resistance values at two different current values (50 nA and 400 nA). The ratio between the low-current and high-current resistance is relatively consistent across the population of memristors.

The formation of conductive paths into the cells of ReRAM devices with the methods, such as those described previously, can be exploited to design low-power, controllable and reconfigurable circuitry for use in PNN synapses.

Figure 5:
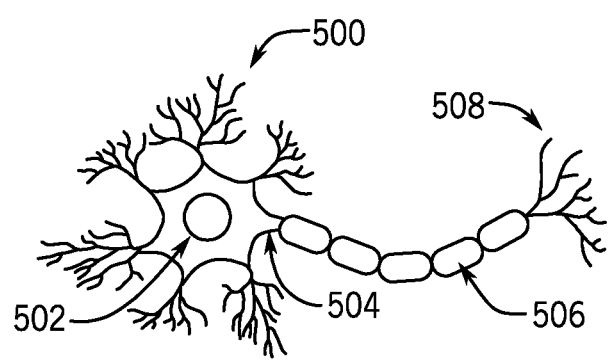
FIG. 5 depicts a detailed diagram of a biological neuron.

FIG. 5 depicts an embodiment of a PNN. The biological inspiration is shown in FIG. 5 with the array of dendrites 500 receiving inputs, the cell body 502 integrating (summing) all the inputs to determine the activation level, the axon hillock 504 comparing the activation level to the threshold to determine the output firing, and the axon 506 carrying the output to its terminals 508 which become synapses on other neurons.

Figure 15:
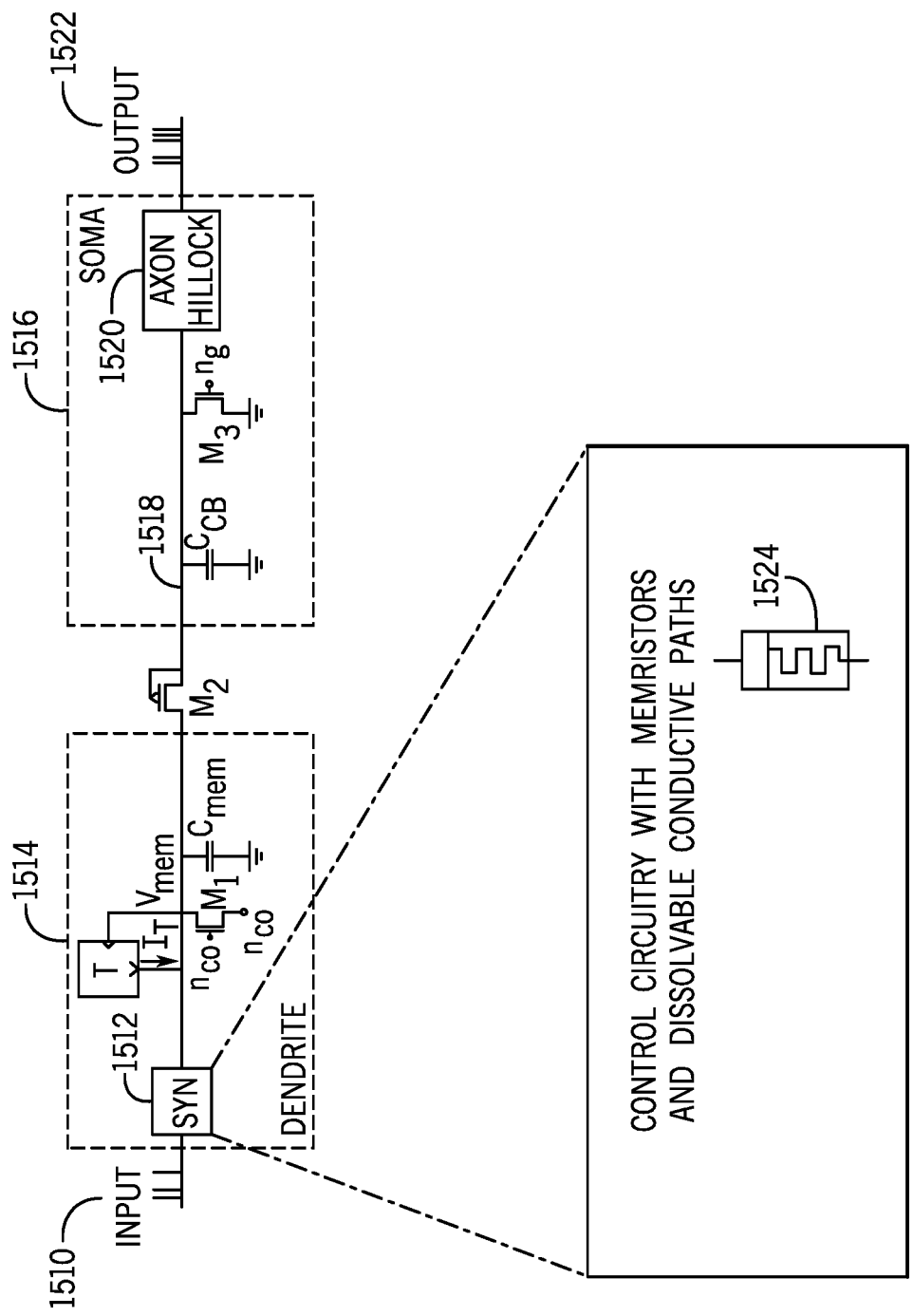
FIG. 15 depicts a diagram of an artificial neuron as it compares to the biological neuron, including an area of interest to the implementation of dissolvable filaments acting as the biological synapse corollary.

Example PNN circuitry is diagrammed in FIG. 15. Input signals 1510 arrive at a synapse 1512 which has a particular weight value. The remainder of the circuitry in the dendrite 1514 serves to appropriately delay the signal. The dendrite 1514 then passes the appropriately weighted and delayed signal to the main soma 1516, where all signals are integrated onto the soma capacitor 1518 to determine the neuron's activation level. In the soma 1516 is the axon hillock 1520 which performs the thresholding operation to determine if the activation level is sufficient to cause the neuron to "fire" and emit an output signal on its output axon 1522.

As shown in FIG. 15, the synapse 1512 may be physically modeled by circuitry including a memristor 1524, wherein the weight of the synapse 1512 corresponds to the resistance of the memristor 1524. To perform the "weighting" function, the circuitry of the dendrite 1514 is configured to scale the input signal 1510 by the resistance of the memristor 1524. The resistance value (the "weight") may serve to scale the input signal by several means, with examples depicted in FIG. 7.

In one embodiment of a PNN, a memristor (e.g. 1524) may be operated according to the "temporary conductive path method" previously described. The varying weight values may be varying resistance values controlled by the magnitude of an injected current. For a neural network containing many neurons and synapses (e.g. FIG. 13), each weight value may be determined by the training set given to the neural network and may be maintained under constant power. To use this neural network for a different application, the power can be removed from each cell which allows each cell to return to the weights of the original pristine state. A new training set can then be input, and the new weights (i.e., resistance values) can be set to deliver the correct output for the new training set.

Figure 12:
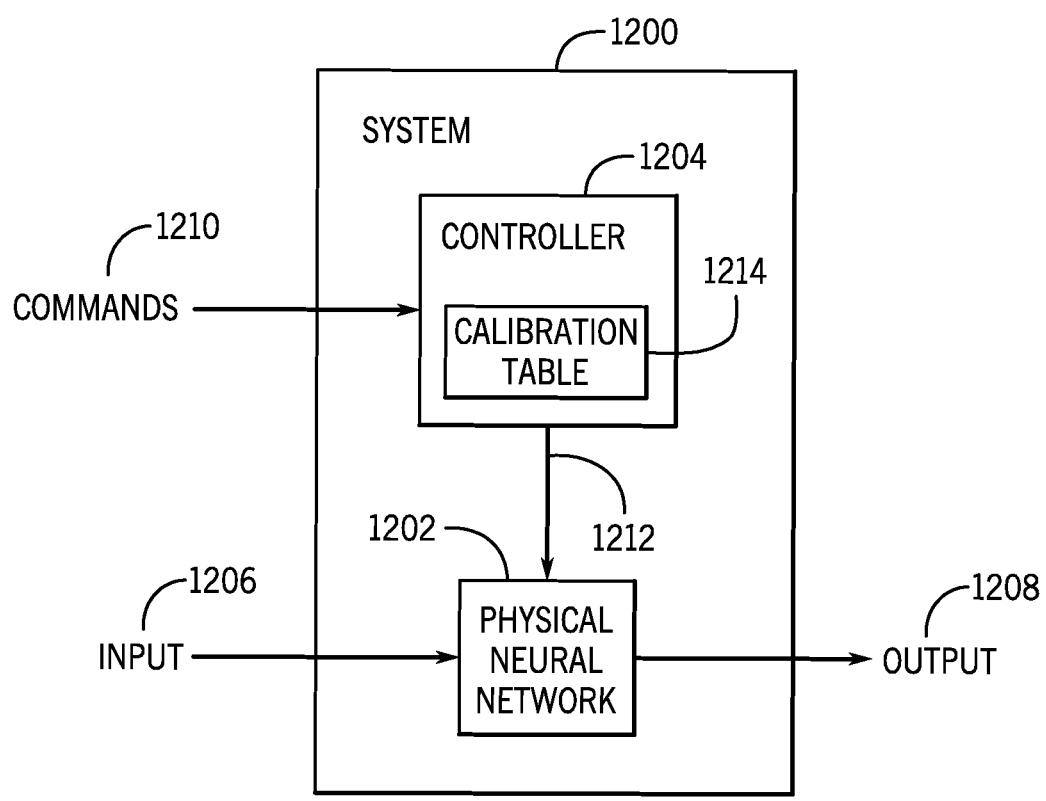
FIG. 12 depicts a diagram of a system utilizing a physical neural network.

An example embodiment of a system using a PNN is shown in FIG. 12. In this embodiment, the hardware system 1200 includes at least a PNN 1202 and a PNN controller 1204. The controller 1204 at least controls the synaptic weights (e.g. memristor resistances) of neurons in the PNN, e.g. by applying currents to memristors in the PNN 1202. The PNN receives external inputs 1206 which are to be processed (e.g. classified), and the PNN responds to those inputs by producing outputs 1208. In a training procedure those outputs may be compared to predetermined values in order to determine any adjustments to be made to the synaptic weights in the PNN 1202. Desired changes may be applied as commands 1210 to the controller 1204, whereupon the controller translates these commands into currents 1212 using a previously-populated calibration table 1214 (see FIG. 10 for example memristor calibration data). The currents are applied to the PNN 1202 to set resistances (e.g. synaptic weights).

Figure 6:
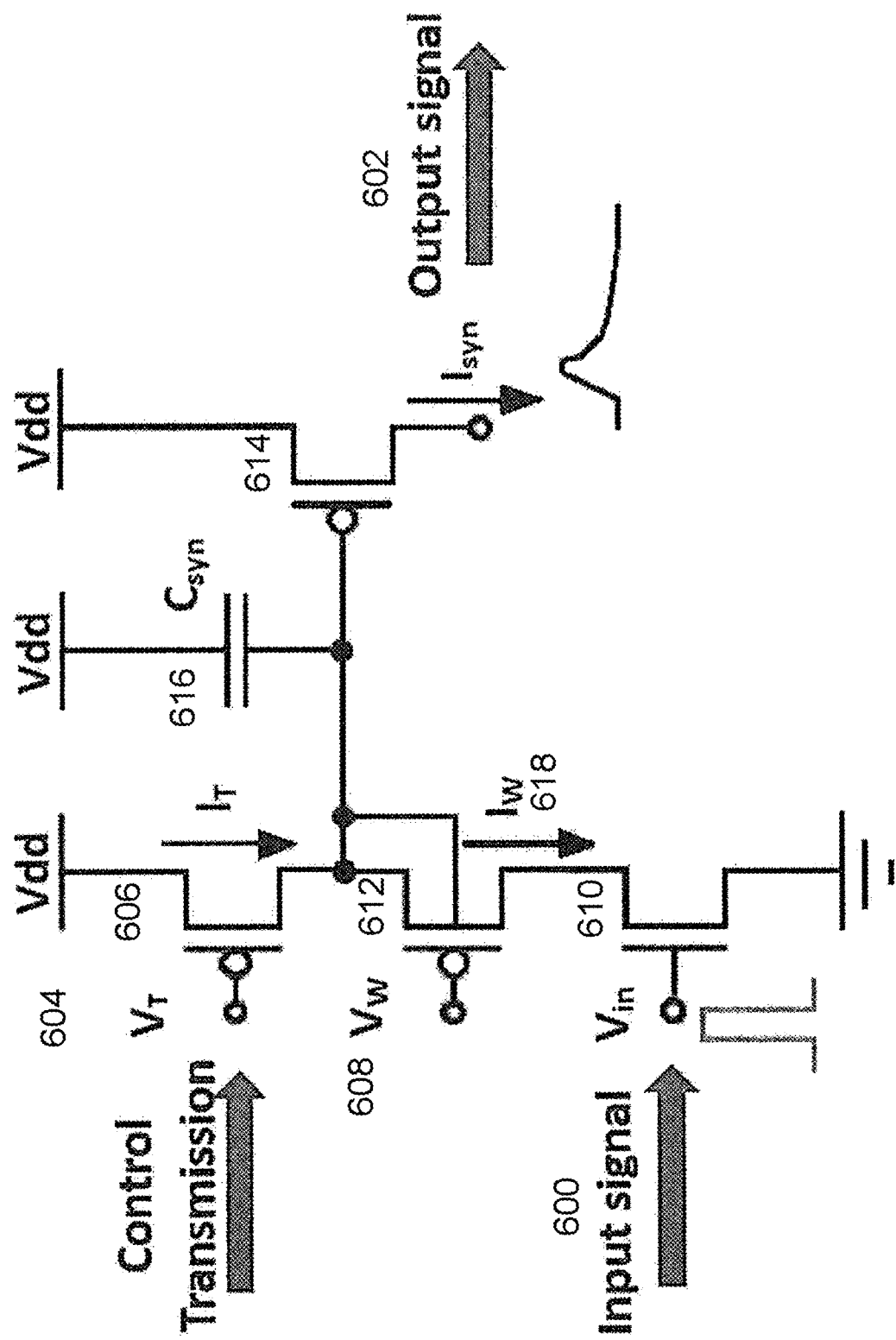
FIG. 6 shows one embodiment of circuitry controlling an artificial neuron.

FIG. 6 depicts one embodiment of circuitry controlling an artificial neuron. An input voltage signal $V_{in}$ 600 is creating a synapse output current signal $I_{syn}$ 602. The transmission is modulated by two control voltage signals: $V_\tau$ 604, and $V_w$ 608. Both control signals may correspond to previous learning of the artificial neuron. This example circuit may be considered to be a log-domain integrator synapse. It includes four transistors: the presynaptic input transistor 610, the weight control transistor 612, the decay control transistor 606, and the output transistor 614. The presynaptic input signal 600 may appear as a short rectangular pulse as depicted. The output signal 602 may appear as an exponentially-decaying pulse as depicted.

This exponential decay in the output signal 602 arises from the discharge behavior of the synaptic capacitor 616. The time constant of this exponential decay is determined by the capacitance of the synaptic capacitor 616 and by the decay control voltage 604 applied to the decay control transistor 606; these two elements together form an RC circuit with a decay time adjustable by the gate voltage 604 applied to the decay control transistor 606.

The weight signal 608, applied to the gate of the weight control transistor 612, determines the allowable weight current 618. This weight current 618 is gated by the presynaptic input transistor 610, such that when the presynaptic input voltage 600 exceeds the gate threshold voltage of the presynaptic input transistor 610, the weight current 618 is permitted to flow. This weight current 618 produces voltage on the gate of the output transistor 614, which controls the flow of output current 602.

This example circuit has two control voltages which may be used to modulate the relationship between the presynaptic input signal 600 and the output signal 602. These two control voltages are the weight control gate voltage 608 and the decay control gate voltage 604. Control voltages such as 604 and 608 may be usefully mediated by memristor-based circuitry as depicted in FIG. 7. A memristor, which may be operated according to the "dissolvable path" method described above, may be used to enhance the dynamic range of control signals such as those which originate in current sources such as 702 and 712.

Figure 7A:
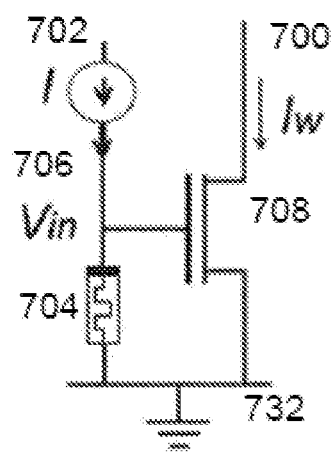
FIG. 7A depicts an embodiment of a circuit integrating memristors in artificial neurons, particularly of a circuit used to control the input signal of the artificial neuron.

Three embodiments of using memristors to adjust signals are illustrated in FIG. 7. As shown in the embodiment to control an input signal 700 in FIG. 7A, an adjustable current source applies a pulsed control current 702 through a memristor 704 resulting in an input voltage $V_{in}$ 706 that is also pulsed. This input voltage 706 controls an NMOS transistor 708 in order to control the current of the input signal 700. Unlike a similar circuit using a fixed resistor rather than a memristor 704, a circuit with a variable resistor 704 can allow a wide dynamic range of the control current 702 while maintaining a useable range of the input voltage 706.

A circuit such as the example circuit shown in FIG. 7A may be employed to control an input signal such as signal 600 in FIG. 6, or to control a weight control signal such as 608 in FIG. 6. In any case, the circuit receives input from an externally-controlled current source (e.g. current source 702). This current passes through a memristor 704, yielding an input voltage 706. This input voltage 706 is nonlinearly dependent on the applied current 702. The input voltage 706 may be applied to the gate of a transistor 708. This transistor may be a presynaptic input transistor (e.g. 610 in FIG. 6), a weight control transistor (e.g. 612 in FIG. 6), or another control transistor.

For example, if a control current 702 varies from 10 nA to 1 μA, a memristor 704 (e.g., a memristor based on Hafnium oxide) may have a resistance varying from 10 MΩ (given 10 nA current) to 1 MΩ (given 1 μA current). Given V=I×R, the resulting $V_{in}$ varies from 100 mV to 1V. Contrastingly, a circuit based on a fixed resistor of 1 MΩ varies from 10 mV to 1V under the same conditions which is 10× more variation and may cause low-end or high-end saturation of the signal control.

Figure 7B:
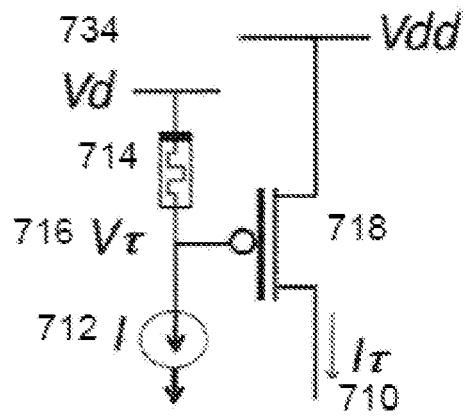
FIG. 7B depicts an embodiment of a circuit integrating memristors in artificial neurons, particularly of a circuit to control the transmission of the input signal.

In the embodiment to control the transmission shown in FIG. 7B, this circuit has a similar function to the one shown in FIG. 7A but driving a PMOS 718 rather than an NMOS 708. A control current 712 is applied to a memristor 714, resulting in a voltage drop to yield the input voltage 716. This input voltage 716 controls a current 710 through a PMOS transistor 718. Example usages of this circuit may be to control a transistor such as the decay control transistor 606 in FIG. 6, or to control a transistor such as the weight control transistor 612 in FIG. 6.

Figure 7C:
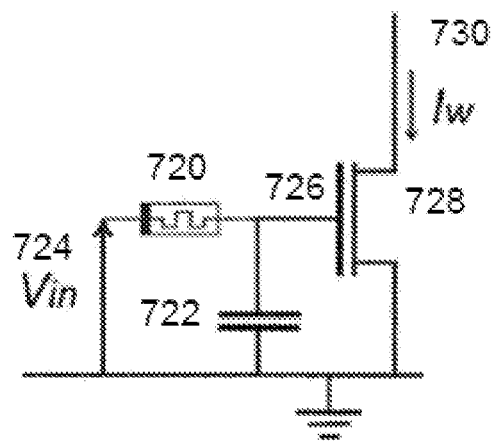
FIG. 7C depicts an embodiment of a circuit integrating memristors in artificial neurons, particularly of an active filter to reduce sources of small noise.

An embodiment depicting an adjustable filter is shown in FIG. 7C. Such an embodiment may be used to filter sources of noise or adjust other time-varying signals in a nonlinear manner. This example circuit may be used to filter input signals such as signal 600 in FIG. 6. The circuit shown in FIG. 7C is an adjustable filter with a response time $T_\tau=R \times C$, with R being the resistance of the memristor 720 and C being the capacitance of the capacitor 722. When the control voltage $V_{in}$ 724 is small, the current through the memristor 720 is small and the resistance R of the memristor 720 is high, thus the resulting voltage 726 applied to the gate of the NMOS transistor is subject to a slow increase due to a long response time $T_\tau$. When $V_{in}$ 724 is high, the resistance R of the memristor 720 quickly drops and the response time $T_\tau$ is much lower, so the resulting voltage 726 is applied to the gate of the NMOS 728 quickly increases. The NMOS 728 controls a current 730. With this embodiment, it is possible to adaptively filter $V_{in}$ 724, such that low input voltages (e.g. noise) are passed through a low-pass filter with a low cutoff frequency, while higher input voltages are passed through a low-pass filter with a relatively higher cutoff frequency. The various embodiments depicted in FIG. 7 may be combined: FIG. 7C describes an adjustable filter that may be used to control an input signal 702 of FIG. 7A. Such a combined method is equally applicable to regulating the control of the transmission depicted in FIG. 7B, by replacing the ground 732 by $V_{dd}$ 734, the NMOS 708 with a PMOS 718, and $I_W$ 700 by $I_\tau$ 710.

In one example embodiment, the memristors are used to store and adjust synaptic weights during a training process. In another example embodiment, the memristors are used to load pre-determined (e.g. previously trained) synaptic weights into a PNN. The fast, low-power adjusting of synaptic weights allows for a "rapid prototyping" process for PNN's, wherein sets of synaptic weights can be quickly loaded, tested, and changed.

The process of setting synaptic weights (e.g. memristor resistances) may be performed as follows. First, the desired weights are determined, either by adjusting existing weights or by loading a set of weights. Second, the current needed to achieve the desired weights is determined based on prior calibration measurements. Third, the necessary currents are applied to the appropriate memristors to achieve the desired synaptic weights within the PNN.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

We claim:

1. A system comprising:
a physical neural network comprising a plurality of neurons, wherein each neuron of the plurality of neurons includes circuitry having at least one memristor and at least one input connection receiving an input signal, wherein the at least one memristor is a nonlinear resistor having a resistance that changes with relation to an electrical current passing through the at least one memristor and the at least one input connection is associated with at least a first synaptic weight, wherein the first synaptic weight comprises a multiplicative gain applied to a first input signal received by the at least one input connection; and
a controller coupled to the physical neural network, the controller configured to execute instructions for:
receiving commands, wherein each command identifies a target resistance value; determining, for each command, a current value corresponding to the target resistance value; and
applying, for each command, the determined current value to the at least one memristor, wherein the at least one memristor is pre-formed;
and wherein the controller is configured to:
access a memristor calibration table, the memristor calibration table including at least one memristor data set, the memristor data set including at least one pair of calibration values, the pair of calibration values including an applied current and a measured resistance; and
use the memristor calibration table to perform the process of determining, for each command, a current value corresponding to the target resistance value.

2. The system of claim 1, wherein the at least one input connection is associated with at least a first synaptic decay constant, and the first synaptic decay constant comprises an exponential decay time constant applied to the first input signal.

3. The system of claim 1, wherein the first synaptic weight is determined by a first resistance value of the at least one memristor.

4. The system of claim 1, wherein the memristor comprises a conductive bridge random access memory element, a resistive random access memory element, or a phase change memory element.

5. The system of claim 1, wherein applying the determined current value to the at least one memristor creates a temporary conductive path within the at least one memristor, and the temporary conductive path is formed between a top electrode and a bottom electrode of the at least one memristor, the temporary conductive path being formed from a material including metallic positive ions, or a dielectric material manufactured with chalcogenide, tantalum oxide, silicon dioxide, or hafnium oxide.

6. A system, comprising:
a physical neural network including a plurality of neurons, wherein each neuron of the plurality of neurons includes circuitry having at least one memristor, and the at least one memristor is a nonlinear resistor having a resistance that changes with relation to an electrical current passing through the at least one memristor; and
wherein an electrical current passing through the at least one memristor is limited such that the memristor is operated according to a temporary dissolvable conductive path method, such that the current value is limited to be below a known forming threshold in order to avoid creating a conductive filament within the memristor, and such that the memristor resistance returns to a baseline value upon cessation of the electrical current; and
a controller coupled to the physical neural network, the controller configured to execute instructions for;
receiving a command identifying a target resistance value;
determining a current value corresponding to the target resistance value; and
applying the determined current value to the at least one memristor;
accessing a memristor calibration table, the memristor calibration table including at least one memristor data set, wherein the memristor data set includes at least one pair of calibration values, the pair of calibration values including an applied current and a measured resistance; and
using the memristor calibration table to perform the process of determining, for each command, a current value corresponding to the target resistance value in the at least one memristor.

7. The system of claim 6, wherein each neuron in the plurality of neurons further comprises at least a first input connection associated with at least a first synaptic decay constant, wherein the first synaptic decay constant is associated with an exponential decay time constant applied to the first input signal.

8. The system of claim 6, wherein at least a first input connection of at least a first neuron of the plurality of neurons is associated with at least a first synaptic weight, wherein the first synaptic weight includes a multiplicative gain applied to a first input signal received by the first input connection; and
wherein the first synaptic weight is determined by a first resistance value of the at least one memristor.

9. The system of claim 6, wherein the at least one memristor includes a conductive bridge random access memory element, a resistive random access memory element, or a phase change memory element.

10. The system of claim 6, wherein applying an electrical current value to the at least one memristor creates a temporary conductive path within the at least one memristor, and the temporary conductive path is formed between a top electrode and a bottom electrode of the at least one memristor, the temporary conductive path being formed from a material including metallic positive ions or a dielectric material manufactured with chalcogenide, tantalum oxide, silicon dioxide, or hafnium oxide.

11. A system, comprising:

a physical neural network including a plurality of neurons, each neuron of the plurality of neurons comprising circuitry having at least one memristor and at least one input connection receiving an input signal, wherein the at least one memristor is a nonlinear resistor having a resistance that changes with relation to an electrical current passing through the at least one memristor and at least a first input connection of at least a first neuron of the plurality of neurons is electrically coupled to the at least one memristor, such that the at least one memristor at least partially determines one or more electrical properties of the first input connection; and a controller coupled to the physical neural network, the controller configured to execute instructions for:

receiving a command identifying a target resistance value;

determining a current value corresponding to the target resistance value; and applying the determined current value to the at least one memristor, wherein the at least one memristor is preformed;

and wherein the controller is configured to:

access a memristor calibration table, the memristor calibration table including at least one memristor data set, the memristor data set including at least one pair of calibration values, the pair of calibration values including an applied current and a measured resistance; and use the memristor calibration table to perform the process of determining, for each command, a current value corresponding to the target resistance value in the at least one memristor.

12. The system of claim 11, wherein the current value is determined such that the memristor is operated according to a temporary dissolvable conductive path method, such that the current value is limited to be below a known forming threshold and is insufficient to create a conductive filament within the memristor, and such that the memristor resistance returns to a baseline value upon cessation of the current.

13. The system of claim 11, wherein at least the first input connection further comprises at least a first synaptic decay constant, wherein the first synaptic decay constant comprises an exponential decay time constant applied to the first input signal.

14. The system of claim 11, wherein the memristor includes a conductive bridge random access memory element, a resistive random access memory element, or a phase change memory element.

15. The system of claim 11, wherein applying the determined current value to the at least one memristor creates a temporary conductive path within the at least one memristor, and the temporary conductive path is formed between a top electrode and a bottom electrode of the at least one memristor, the temporary conductive path being formed from a material including metallic positive ions or a dielectric material manufactured with chalcogenide, tantalum oxide, silicon dioxide, or hafnium oxide.

* * * * *